United States Patent
Takeda et al.

[11] 3,819,248
[45] June 25, 1974

[54] MULTIPLE EXPOSURE HOLOGRAPHIC APPARATUS IN WHICH PHASE RELATIONSHIP IS RANDOMLY CHANGED WITH EACH EXPOSURE

[76] Inventors: Yasutsugu Takeda, 4-22-10 Honcho, Kokubunji; Yoshitada Oshida, 438 Minamioizumi-machi, Tokyo; Fumio Imagawa, 2278-Owada-cho, Hachioji, all of Japan

[22] Filed: Sept. 18, 1972
[21] Appl. No.: 289,649

[30] Foreign Application Priority Data
Sept. 16, 1971 Japan.................................. 46-71193

[52] U.S. Cl. ............................................. 350/3.5
[51] Int. Cl. ............................................ G02b 27/00
[58] Field of Search ................................ 350/3.5

[56] References Cited
UNITED STATES PATENTS
3,539,241  10/1970  Upatnieks ...................... 350/3.5
3,604,778  9/1971   Burckhardt ..................... 350/3.5
3,614,200  10/1971  Taylor ........................... 350/3.5
3,647,275  3/1972   Ward ............................ 350/3.5
3,650,595  3/1972   Gerritsen et al. ............... 350/3.5
3,684,351  8/1972   Kumada ......................... 350/3.5

*Primary Examiner*—H. K. Saalbach
*Attorney, Agent, or Firm*—Craig & Antonelli

[57] ABSTRACT

A multiplex exposure type holographic apparatus, wherein the light which has passed through a two-dimensional light information composing element, such as a light shutter and the interferential reference light are caused to interfere with each other on the surface of a light recording medium to thereby make a hologram, characterized in that, in order to eliminate noise of the reproduced image produced in said apparatus, means for modulating the light phase is provided in the path either of the object light beam or of the reference light beam, so as to provide a relative phase difference when each exposure is made in the multiplex exposure process.

6 Claims, 8 Drawing Figures

PRIOR ART

MULTIPLE EXPOSURE HOLOGRAPHIC APPARATUS IN WHICH PHASE RELATIONSHIP IS RANDOMLY CHANGED WITH EACH EXPOSURE

BACKGROUND OF THE INVENTION

This invention relates to a method and an apparatus for eliminating or minimizing noises other than those of a required signal in a holographic memory. More particularly, it relates to a method and an apparatus for arresting an increase in noises other than those of desired information in the case of recording information on a hologram by a multiplex exposure system, to thereby reduce the noise incidental to the reproduced images.

DESCRIPTION OF THE PRIOR ART

A "Holographic Memory" is a device for memorizing two or three-dimensional light information in a most stabilized manner, while keeping the stored information perfectly safe from being damaged by scratches, dust or other alien substances, and many attempts are being made for broader utilization of such a device in light information processing systems. It is particularly noteworthy that there has recently been a proposal regarding a light information composing element which allows the composition of two-dimensional light information by use of electric signals. This has greatly increased the possibility and prospect for utilization of holograms for storing electric information in the form of a light memory. The term "light information composing element" is used herein to refer generically to elements which impart two-dimensional information to light that passes said elements. They include photographic films, such as minicopy films, punched cards, tapes, a matrix of light shutters which are actuated by electric signals, and so forth. Among the light shutter types are those in which a liquid crystal is held at both its sides by glass plates provided with a plurality of transparent electrodes and the amount of transmission or reflection of light (such transmission or reflection is hereinafter represented by a term "passage") effected by the liquid crystal is varied by an electric signal, or those in which modulation of the phase, amplitude, direction of polarization, etc., of the light is performed by a ferroelectric material which may have its polarization reversed by an electric signal.

The light beam which has passed through the light composing element interferes with the reference light beam on the surface of a light memory medium to produce a hologram. It is not necessarily required, depending on the characteristics of the light information composing element used, to actuate all parts of the light passing plane at the same time; in some cases, such a plane may be divided into an M number of sections (M being a positive integer) and such sections may be actuated at suitable time intervals, such as at time $t_1$ (sec.), $t_2$ (sec.), ... $t_M$ (sec.), respectively. In general, use of such a multiplex light information composing method allows significant simplification of design and manufacture of the elements, thus encouraging further efforts for wider applications of such a method in the future.

In the following, practical use of such a light information composing element, as adapted in a known holographic apparatus, will be briefly explained while clarifying the problems involved therein. For the sake of simplicity, there will be taken up a case where an informational element "1" corresponds to the transmission (bright part) of light and informational element "0" to the interception (dark part) of light, respectively, by way of elucidating the defects accompanying the information recording practices according to conventional multiple exposure systems.

A hologram device for recording information with a multiplex exposure system includes a combination of a polarizing plate and a quarter-wavelength plate for forming slit-like bright and dark spots of light in one direction or in a column and another combination of polarizing plate and a quarter-wavelength plate for forming slit-like bright and dark spots of light in a direction perpendicular thereto or in a line. An information bit distributed two-dimensionally can be constituted by a light beam and the shade of the transmitted light, by combining suitable selections of bright and dark spots in the column direction and those in the line direction. For recording two-dimensional information on the hologram, one line at the extreme, that is to say, the first line, is made into a bright part while making all of the remaining lines into dark parts and, then bright and dark parts are produced in the column direction according to the type of information of the first line, to thereby record the information of the first line. Recording of information of the second and other ensuing lines is conducted in the same manner. Thus, N exposures are effected until the final Mth line is reached to complete the recording of the informations of all lines.

Let is be assumed that the amplitudes of the light at the bright and dark parts are $A_s$ and $A_n$, respectively. If the optical system is perfect, it is theoretically possible to make $A_n$ zero, but actually, $A_n$ has a possible minimum value of about $1/100$ of $A_s$. Therefore, even when the information on a particular line is being recorded, light could leak from other lines ((M-1) lines, which are supposed to be in shade) rather than from said particular line, and such leaked light is also recorded on the hologram recording medium. The influence of such leakage becomes more conspicuous as the multiplicity is increased, resulting in an extremely reduced signal-noise ratio of the reproduced image, so that it is practically impossible to further increase the multiplicity of exposures.

Stated in another way, the above-said conventional device has the following two fatal defects:

1. In this device, the processing of information on M number of lines is effected by sectioning the process into M times of operations, so that the reproduced image is inevitably attended by greater noise than in the case of an ordinary holographic apparatus where processing is effected in one operation. In other words, if one attempts to reduce the noise of the reproduced image to the level of the ordinary holographic apparatus, the reproduced image becomes too dark to allow reading.

2. The light shutter actions in both the line and column directions are actually accompanied with some leakage. The value obtained by dividing the quantity of such leakage by the quantity of light corresponding to an informational "1" is usually on the order of $10^{-4}$, but actually there is produced an accumulation of the leakage which is proportional to the square of the number M of exposures. As discussed above, $A_n$ has a minimum threshold value of about $1/100$ of $A_s$, so that when M approaches 100, the amount of leakage becomes substantially equal to the information.

SUMMARY OF THE INVENTION

It is an object of the present invention to provide an apparatus for preparing a hologram which produces little noise in the reproduced image, even if multiplex exposure processing is followed.

It is another object of the present invention to provide an apparatus of the type described, whereby a hologram can be manufactured at high speed.

It is still another object of the present invention to provide an apparatus of the type referred to, which is simple to construct and low in cost.

In order to accomplish the above objects, the present invention proposes, among others, the provision of a light phase modulating device in the path of either the object light or the reference light, so as to provide a relative phase difference at the time of each exposure in the multiplex exposure processing.

The other objects, features and advantages of the present invention will become more apparent from reviewing the following detailed description of the preferred embodiments of the present invention when taken in conjunction with the accompanying drawings.

DESCRIPTION OF THE PREFERRED EMBODIMENTS

Figure 1:
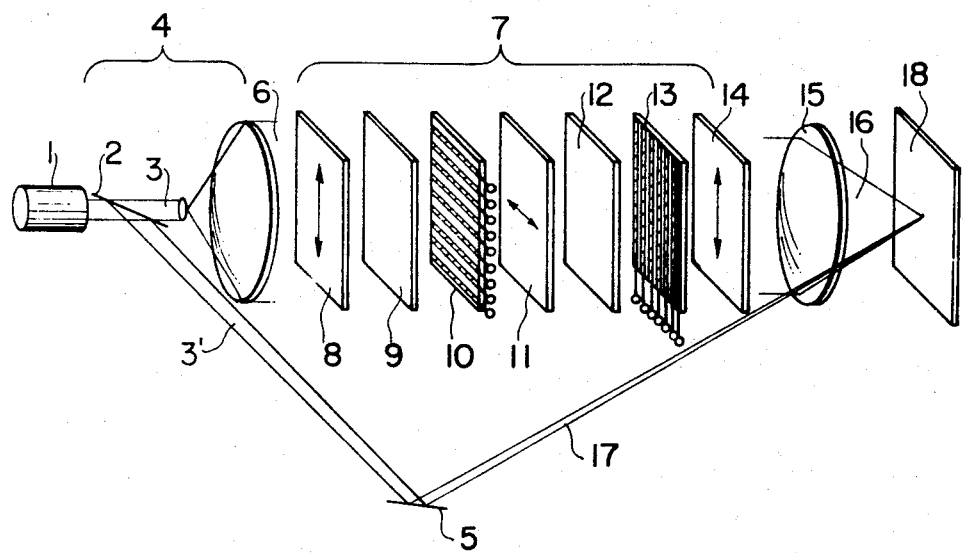
FIG. 1 is a schematic arrangement plan of a prior art holographic apparatus.

In FIG. 1 there is illustratively shown a typical prior art holographic apparatus. In this figure, numeral 1 designates a laser device, 2 a beam splitter, 3 the laser light beams which have passed through the beam splitter, 3' the laser light beams which were reflected by the beam splitter, 4 a beam expander, and 5 a mirror. As will be seen the laser light beam 3 is changed by the beam expander 4 into a uniform parallel light flux 6 for illuminating the desired area and further proceeds on toward a two-dimensional light information composing unit 7. Unit 7 consists of a polarizer 8, a quarter-wavelength plate 9, a ferroelectric plate 10 which is provided with a plurality of filamentary transparent electrodes arranged in the line direction (A–A' direction) and which is equal in thickness to the quarter-wavelength plate 9, a light analyzer 11, a second quarter-wavelength plate 12, a second ferroelectric plate 13 which is provided with a plurality of filamentary transparent electrodes arranged in the column direction (B–B' direction) and which is equal in thickness to the second quarter wavelength plate 12, and a second light analyzer 14.

The unit operates as follows. The parallel flux 6 is changed into a linear-polarized light beam by the polarizer 8 and passes through the quarter-wave plate 9, whereby the plane of polarization is rotated clockwise (or counterclockwise). The ferroelectric plate 10 is provided with an M number of filamentary electrodes arranged horizontally (or in the line direction), and an electric signal is applied to these electrodes successively in timed relation with respect to one another. The polarization of the ferroelectric is reversed by the applied electric signal to permit the plane of polarization of the light to be rotated clockwise (or counterclockwise) and be arranged evenly in the horizontal (A–A') direction, that is to say, in the direction of passage of light in the light analyzer 11. On the other hand, those parts of the ferroelectric plate, on which the electrodes at which no electric signal has arrived are disposed, operate to arrange the clockwise (or counterclockwise) rotated plane-polarized light in the vertical (B–B') direction, that is to say, in the light-intercepting direction of light analyzer 11.

In this manner, each of the M number of filamentary transparent electrodes in timed relation with each other is supplied with an electric voltage and, as the light of each line passes through the light analyzer 11, the laser light flux advancing toward the second quarter-wavelength plate 12 from said light analyzer 11 is switched from line to line by the electric signal. The operation for writing information in the light flux for each line will be explained below.

When the filamentary light flux of the first line passes through the second quarter-wavelength plate 12, the plane of polarization of the light is again rotated in a clockwise (or counterclockwise) direction. The ferroelectric plate 13 is provided with an N number of filamentary transparent electrodes arranged in the column direction, but these electrodes are designed such that an electric signal for reversing the polarization is applied simultaneously only to those places where information "1" is to be written. The light which has passed through such electric signal-applied parts of the ferroelectric plate has its plane of polarization rotated to be aligned in the vertical direction, or the direction in which the light passes through the light analyzer 14, and thereby, light information for one line is set up. The light flux which has passed the light analyzer 14 is focussed by an information writing-in lines 15 to be thereby formed into an information light 16 beam and arrives at light storage medium 18. On the other hand, the laser light beam 3' is reflected by the mirror 5 to become a reference light beam 17, which then interferes with the information light 17 on the light recording medium 18, whereby a hologram recording is made. The same operation is repeated from the second to the Mth line to finally form one section of a hologram. In case the space between the lens 15 and the light storage medium 18 is substantially equal to the focal distance $f$, the information light distribution on the light storage medium 18 is substantially equalized to provide a Fourier transform of the light information distribution which has passed through the light analyzer 14. Such hologram making apparatus is called a Fourier transform type holographic apparatus. In the embodiments of the present invention that follow, this Fourier transform type is used unless otherwise specified.

Now, the present invention is described in further detail by way of some of the preferred embodiments.

EXAMPLE 1

This embodiment is intended to provide an apparatus for forming a hologram by letting the light, which has passed through the two-dimensional information composing element, interfere with the ready-to-interfere reference light beam on the surface of a light recording medium, wherein a random phase is imparted simultaneously for each section of the information light which has been divided into an M number of sections, to thereby alleviate or eliminate the above-mentioned defects of the conventional devices. The above-described apparatus used in this embodiment is particularly characterized by the provision of means for dividing the light information composing element two dimensionally into a plurality of areas and furnishing information, which has been composed in each section, in timely succession and within an equal time span, and a space modulator for providing a random phase for each information light beam which has passed through each section in timed relation with the others.

Figure 2:
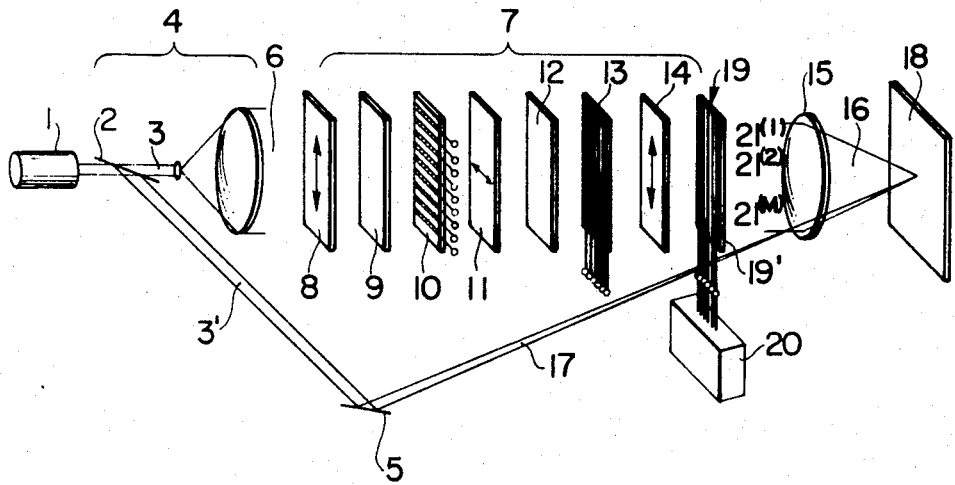
FIG. 2 is a schematic arrangement plan of an embodiment of the holographic apparatus according to the present invention.

In FIG. 2 is a schematically illustrated the arrangement of a holographic apparatus used in the instant embodiment. This arrangement includes, specifically a special modulator 19 adapted to provide a random phase shift to the light, a ferroelectric plate 19', an electric power source 20 for driving the modulator, and a plurality of transparent electrodes $21^{(1)}$, $21^{(2)}$, . . . $21^{(M)}$ provided on the surface of the ferrorelectric plate 29'. Otherwise the arrangement is same as that of FIG. 1.

The space modulator used in the embodiment of FIG. 2 is prepared by slicing a gadolinium molybdate crystal vertically along the C axis of the crystal, with its thickness $t_0$ being selected to satisfy the following formula (1), and attaching nesa transparent electrodes to both faces thereof:

$$t_0 = \lambda/2 \, (n_a - n_b) \tag{1}$$

where $\lambda$ stands for the wavelength of the light beam, and $n_a$ and $n_b$ for the refractive indices of light in the directions of $a$-axis and $b$-axis of the crystal, respectively.

Now, let it be supposed that the direction or polarization of the output of the light information composing element is along with the $a$-axis. Here, an electric signal from a driving power source 20 is applied to an $M_1$ number of electrodes ($M_1 = \frac{1}{2} M$) which were selected at random from the total M number of electrodes, and it is further supposed that the voltage applied at that time is higher than the threshold value of polarization. In the case of using a material such as gadolinium molybdate, not only polarization reversal but also a change of crystal structure occurs to cause reversal of the $a$- and $b$-axes. Consequently, the phase of the light which has passed through this crystal is relatively shifted by 180° ($\pi$) in accordance with formula (2) set out below.

This phase pattern from the application of an electric signal is maintained throughout the period when the light information composing element is from light information of a certain line and, in the course of composition of light information of the next line, a subsequent series of electric signals from the source 20 are applied to an $M_1'$ number of electrodes ($M_1' = \frac{1}{2} M$) selected randomly, but independently of the previous selection. The same operation is repeated in succession. In this embodiment, a combination of "0" and "$\pi$" was given as an example of random phase. This is because of the likelihood that it would be actually very difficult to produce too many kinds of phases in view of the ease in making phase plates for generating random phases in spaced and time relation with one another, However, since such a definition dies not, in the least, affect the effectiveness resulting from adding random phases and from changing the added phases for each line, we continue our discussion along the same line as above.

How defects (1) and (2) are solved in the arrangement of FIG. 2 will be discussed below.

Suppose that the amplitude (complex quantity expressed in terms of effective value) of light when "1" was indicated at the $m$-line, $n$-column, section of the light information composing element is described as $A_{mn}$, that the leakage of light from this section when "0" was indicated is described as a $_{mn}$, and that the random phase of the $n$-th column when the light information of the $m$-th line is composed is $\theta_{mn}$. Then the amplitude $S_m$ from the light information composing element on the light recording material surface at the time of $m$-th exposure is given from the following formula (2):

$$S_m = \sum_{n=1}^{N} F\,[A_{mn} \exp(\lambda \theta_{mn}) + \sum_{m=1}^{M} a_{ln} \exp(i\theta_{mn})] \tag{2}$$

where F stand for Fourier transform.

If the reference light on the hologram plane is expressed by R, the energy $I_m$ at the $m$-th time of exposure is given as follows:

$$I_m = \tau |R + S_m|2 \tag{3}$$

where $\tau$ stands for each exposure time interval.

The total exposure energy I produced by carrying out the operation from $m = 1$ till $m = M$ is given by the formula (4) that follows:

$$I = \sum_{m=1}^{M} I_m = \tau \left[ MRR^* + R^* \sum_{m=1}^{M} \sum_{n=1}^{N} F\left[\left(A_{mn} + \sum_{l=1}^{M} a_{ln}\right) \exp(i\theta_{mn})\right] + R \sum_{m=1}^{M} \sum_{n=1}^{N} F\left[\left(A^*_{mn} + \sum_{l=1}^{M} \bar{a}^*_{n}\right) \exp(i\theta_{mn})\right] + \sum_{m=1}^{M} \left[\sum_{n=1}^{N} F\left[\left(A_{mn} + \sum_{n=1}^{M} a_{ln}\right) \exp(i\theta_{mn})\right] \sum_{n=1}^{N} F\left(A^*_{mn} + \sum_{m=1}^{M} a^*_{n}\right) \exp(-i\theta_{mn})\right] \right]. \tag{4}$$

What is to be particularly noted in the above formula (4) is the second and fourth terms. It is generally known that the characteristics of the reproduced image of the hologram bear close relation with the exposure energy I. The reproduced image amplitude is proportional to the inverted Fourier transform of the second term of the formula (4), and there is a close correlation between the noise and the value of the fourth term.

The second term may be expressed in a more simplified form as follows:

[ Second term of formula (4) ] $= \tau R^* F$ $$\left[\sum_{m=1}^{M}\sum_{n=1}^{N} A_{mn} \exp(i\theta_{mn}) + \sum_{l=1}^{M}\sum_{n=1}^{N} a_{ln} \sum_{m=1}^{M} \exp(i\theta_{mn})\right]$$

(5)

The first term of the right member of the formula (5) includes $A_{mn}$ and expresses the desired reproduced image energy obtained from inverted Fourier transformation, while the second term includes $a_{mn}$ and indicates reproduced energy of leakage light. If $O_{mn} = O$, that is to say, in case there is no element which forms the random phase shift according to the present invention, the first term of the right member of formula (5) gives $$C \sum_{m=1}^{M}\sum_{n=1}^{N} A_{mn}$$

(where $C$ is a constant) as the desired reproduced information light beam, and also gives $$C' \sum_{l=1}^{M}\sum_{n=1}^{N} M a_{ln}$$

(where $C'$ is a constant) as the reproduced leakage light beam. In other words, the rate of intensity of the leakage light to the intensity of reproduced information light (N/S) in the reproduced image is given by the following formula (6):

$$N/S = M^2 \ (a^2{}_{ln})/(A^2{}_{mn})$$

(6)

Supposing that $M = 100$ in the above formula, $N/S$ will be approximately 1 even if it is assumed that $a^2{}_{lm}/A^2{}_{mn} = 10^{-4}$, as aforementioned. On the other hand, in the case of adding an element 19 that provides a random phase shift in the present invention, the first term of the right member of formula (5) gives $$C \sum_{m=1}^{M}\sum_{n=1}^{N} A_{mn} \cdot \exp(i\theta_{mn})$$

as the desired reproduced information light. $\exp(i\theta_{mn})$ means that the reproduced image has undergone a phase modulation, but this cannot be measured by a detector the output of which is proportional to the "intensity" of light. In fact, most of the presently used light detectors are of the type whereby "intensity" of light is detected, so that it is impossible with these devices to measure the phase modulation.

Regarding the second term of the right member of formula (5), the value of $$\sum_{m=1}^{M} \exp(i\theta_{mn})$$

may be made zero or a value close to zero by making arrangement such that 0 and $\tau$ will appear each in substantially half as $\theta_{mn}$. This signifies a phenomenal effect of solving at a stroke the problem concerning accumulation of leakage light. Here, the ratio ($N/S$) of intensity of leakage light and intensity of reproduced information light in the reproduced image is expressed by the following formula (7)

$$N/S = 0$$

(7)

A markedly increased effect of reducing noise will be noticed as compared with the case of formula (6).

Considering now the fourth term of the right member of formula (4), it may be expressed in an easier-to-understand way as follows:

$$[\text{Fourth term of formula (4)}] = \tau \sum_{m=1}^{M} \left[ F \sum_{n=1}^{N} [A_{mn} \exp(i\theta_{mn})] \cdot F \sum_{n=1}^{N} [(A^*{}_{mn} \exp(-i\theta_{mn})] \right]$$ (8)

In the above, an approximation of $A_{mn} \gg$ $$A_{mn} \gg \sum_{l=1}^{m} a_{ln}$$

was used.

If $\theta_{mn} = 0$, that is to say, in case there is no element composing the random phase according to the present invention, the formula (8) represents the sum of the square of the Fourier transformation of $$\sum_{n=1}^{N} A_{mn}$$

with respect to $m$. Here, $A_{mn}$ is information light from the light information composing element, but as it usually has a certain spatial period, its Fourier transform produces a sharp spectrum structure, and also, the maximum value of its square is expressed by $A_{mn}{}^2 N^2$. On the contrary, if there exists an element forming a random phase according to the present invention, the spatial periodicity of $A_{mn}$ is destroyed by the random phase modulation of $\exp(i\theta_{mn})$, and the spectrum structure, by its Fourier transform, is sharply reduced. Further, the maximum value of its square is expressed by $A_{mn}{}^2 N$ and hence, it is learned from formula (8) that in case $N = 100$, the numerical value of the term relating to noise can be diminished to 1/100. The effects of the present invention have been substantially described in the above.

Figure 3:
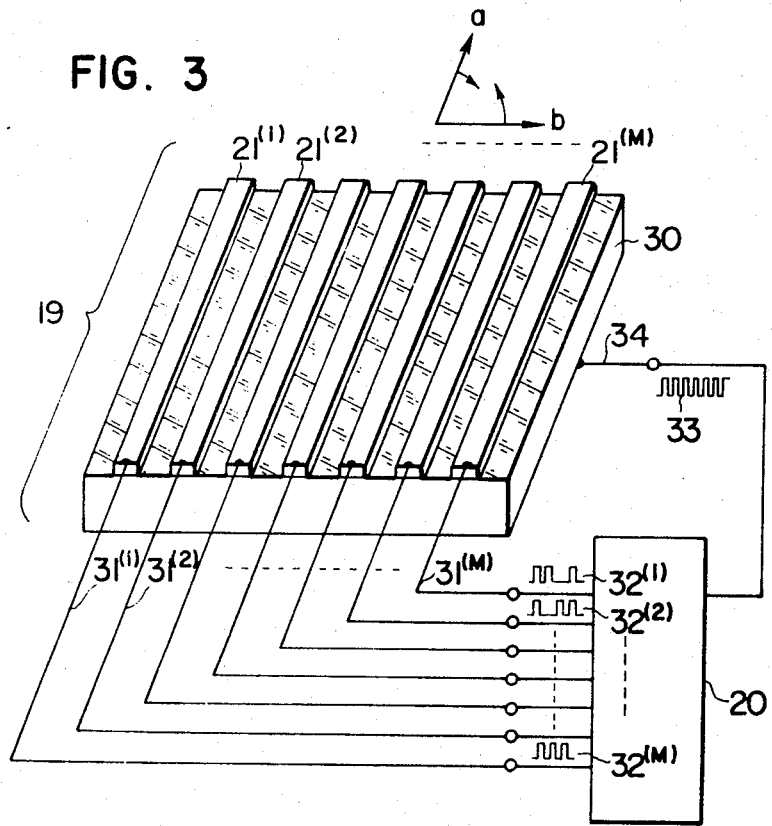
FIG. 3 is a schematic arrangement plan of a spacial or space modulator used in the holographic apparatus of the present invention.

Referring to FIG. 3, there is illustrated in further detail the operation of the element 19 for forming a random phase and the power source 20 for actuating the element. In the same figure, numerals 19, 20, 21$^{(1)}$, 21$^{(2)}$ ... 21$^{(M)}$ designate the same elements as in FIG. 2 and $a$ and $b$ represent the aforesaid $a$-axis and $b$-axis, respectively. 30 denotes a ferroelectric plate, 31$^{(1)}$, 31$^{(2)}$, ... 31$^{(M)}$ the lead wires connecting the respective transparent electrodes 21$^{(1)}$, 21$^{(2)}$, ... 21$^{(M)}$ to the power source 20, and 34 a lead wire connecting the transparent electrodes on the back of the ferroelectric 30 to the power source 20. Numerals 32$^{(1)}$, 32$^{(2)}$, ... 32$^{(M)}$ show, in time relation, the electric signals that cause reversal of the $a$-axis and $b$-axis of the ferroelectric 30. The light passing through the ferroelectric plate at the portion of the transparent electrodes at which the electric signal has arrived is applied with a phase "$\pi$", while the light passing through the ferroelectric plate at the portion of the transparent electrodes at which no electric signal has arrived is applied with a phase "0". The selection of locations at which "$\pi$" or "0" is generated by the pulse of the electric signals is made quite randomly by a random generating mechanism in the driving power source 20. Numeral 33 is a time related showing of an electric signal for returning the a-axis and b-axis of the ferroelectric 30 to their respective original positions. Its timing is made such that the electric signal 33 will arrive during the waiting time for arrival of the electric signals $32^{(1)}, 32^{(2)}, \ldots 32^{(M)}$.

Figure 4:
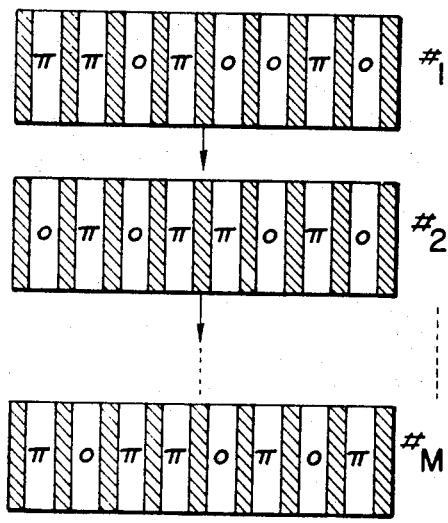
FIG. 4 is an illustration showing the manner in which the phase is imparted by the space modulator to the transmitting light in timely succession.

FIG. 4 is a diagrammatic illustration to facilitate understanding what phase is applied to the light by the element 19 which creates a random phase.

In this specification, we have shown, as preferred examples of the elements for forming random phases, the ones in which the transparent electrodes are secured to a ferroelectric material and, as a particular embodiment, the use of gadolinium molybdate crystal as ferroelectric material was discussed. It should, however, be noted that similar effects can also be obtained by using other types of crystals which exhibit required electrooptical effects such as KDP, DKDP, BNN or SB 75, or the ferroelectric ceramics such as PLZT which have similar electrooptical effects.

Figure 5:
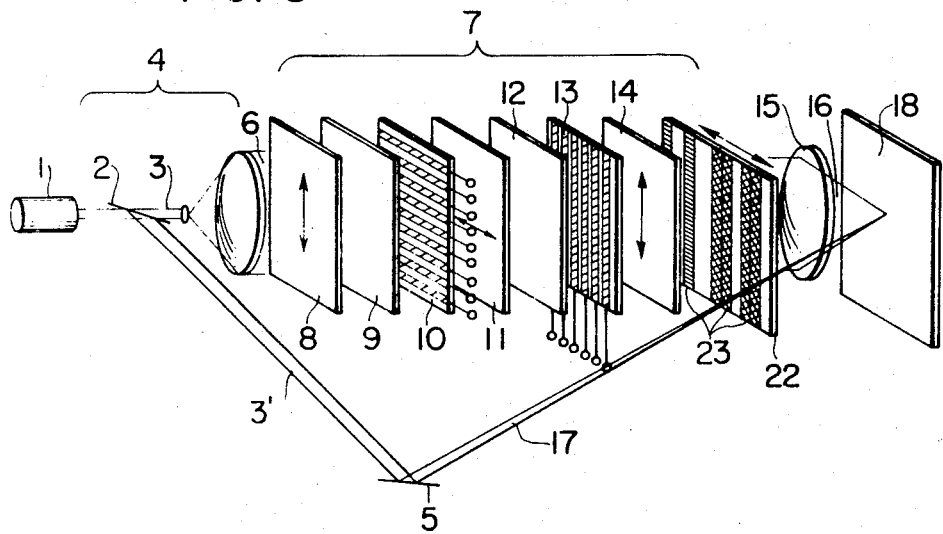
FIGS. 5, 6 and 7 are schematic arrangement planes of other embodiments of the holographic apparatus according to the present invention.

The elements used for forming random phases are not limited to those which are actuated by electric signals. The same object can as well be accomplished by using an arrangement in which, as shown in FIG. 5, a glass plate 22 evaporation-coated with transparent randomly patterned films 23 of dielectric 1 adapted to provide random phase shifts to light at least in the column direction is moved mechanically in the direction of arrows. It will, however, be easily understood that generally the electric signal driving system demonstrates for superior performance in speed as compared with the system using a mechanical moving mechanism.

Also, as already stated, various types of elements such as for example photographic films, punched cards, tapes, liquid crystals and the like are considered adaptable as the two-dimensional light information composing elements, but according to the present invention, the above said effects can be attained regardless of the type of element used. However, in a multiplex exposure type holographic apparatus which performs formation of information in the unit of a line or a column within the same time span by a light information processing device of an M-line, N-column matrix arrangement, the driving electric signal generating circuit is very simplified in its arrangement and, hence, its practicality is greatly enhanced.

EXAMPLE 2

Figure 6:
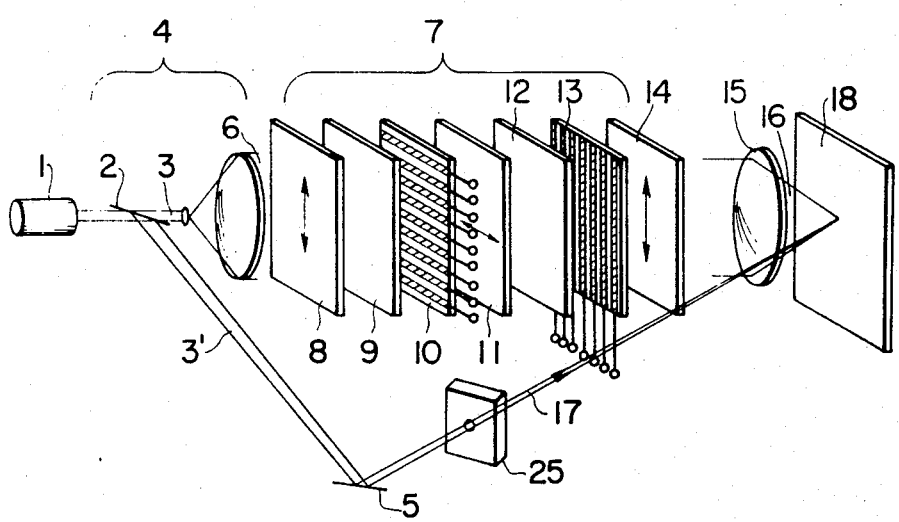

Referring now to FIG. 6, there is shown another embodiment of the present invention. In the apparatus of this embodiment, a means for providing a random phase shift is provided in the path of the reference light beam. In the figure, numeral 25 designates a phase modulator for modulating the phase of the reference light beam 17, the phase modulator being disposed in the parts of the reference light as shown. As the phase modulator 25, there may be used gadolinium molybdate which is capable of giving two-stage phase modulation, or DKDP or PLZT which produces multi-stage phase modulation with applied voltage.

In each of the above types of phase modulator, the phase of the light passing through the crystal is modulated by electrically changing the crystalline state, but the same object can as well be accomplished by using an arrangement in which transparent material is inserted in the reference light beam and the light beam length of the beam crossing the transparent material is varied so as to shift the phase of the reference light that reaches the recording medium 18. The same end can also be attained by using the technique of inserting a transparent object in the path of the reference light beam and varying the refractive index of the transparent object.

Now, the method of making the holographic memory according to the present invention will be set forth. A predetermined voltage is applied to the first line of the spacial modulator 10 which provides information in the line direction, such that only the light passing through the first line will pass through the polarizing plate 11. Consequently, only the first line of the light passing through the polarizing plate 11 is made bright. Not only the spacial modulator 10, but also several of the M number of filamentary electrodes arranged in the column direction on th space modulator 13 are applied with a voltage corresponding to the information of the first line, so that the light passing through the polarizing plate 14 will form bright and dark sections corresponding to said first line information. Since the light beam entering the space modulator 13 after passing through the special modulator 10 is oriented in the line direction, the light passing through modulator 13 is of a relatively small area where the projected shadows of the filamentary electrodes in both line and column directions intersect with one another. Then the voltage is applied in the same way to the second, third, . . . and finally Nth line of the space modulator 13, allowing the light beams to pass through the space modulator 13 in succession. The thus obtained information light beam of the first line is transmitted through the lines 15 and is focused on the hologram medium 18. On the other hand, the reference light beam 17 undergoes a phase modulation of $\phi_1$ when passing through the phase modulator 25 and then impinges upon the hologram medium 18. The interference fringes formed between this reference light beam and the information light beam of the first line is recorded, for instance for opening a light shutter (not shown) disposed in front of a beam splitter. Then, the light information of the second line is formed in the same method as above but the phase modulator is arranged such that the amount of modulation effected in the reference light beam will be $\phi_2$, and the second exposure is performed by opening the shutter. Exposure is repeated until the final line information is recorded. In the case of using a phase modulator where transparent electrodes are provided on both sides of a half-wavelength plate of gadolinium molybdate, a voltage higher than the threshold value of crystal reversion of either $+V_f$ or $-V_f$ is applied to both faces of the crystal at the time of each exposure so that substantially half of the phase moldulations $\phi_1, \phi_2, \ldots \phi_N$ will become 0, while the remaining half will become $\tau$.

It is also possible to use DKDP ($KD_2PO_4$ double hydrogen potassium phosphate) or PLZT ($Pb_{0.9}La_{0.09}(Zr_{0.65}Ti_{0.35})O_3$) as a phase modulator. In this case, multi-stage phase modulation quantities distributed substantially evenly between 0 and 2 are given by applying voltages of multi-stage values. Such multiple-stage phase modulation can also be performed mechanically by utilizing the variation of the refractive index by gaseous pressure or a variation of the pass length of the light passing through a transparent object (such variation of the light pass length may for instance be achieved by moving a glass plate which has slight inclinations on both its sides).

Figure 7:
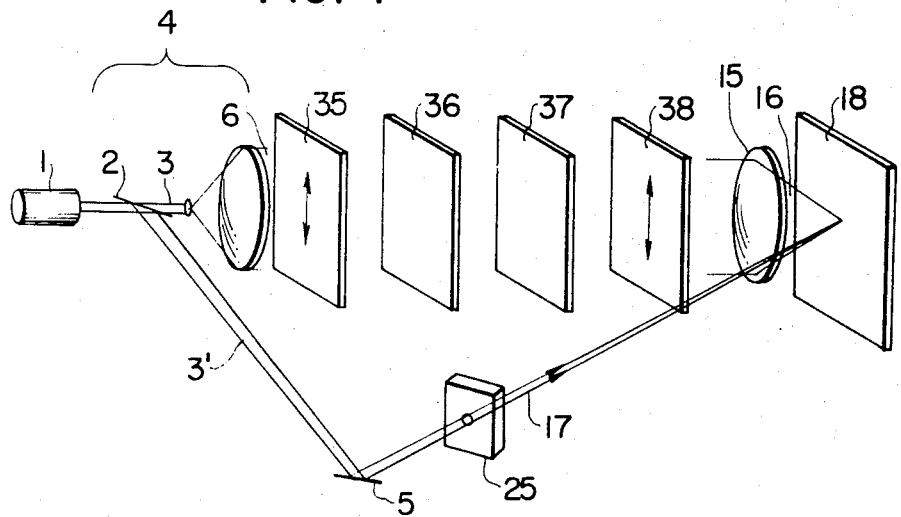
Figure 8:
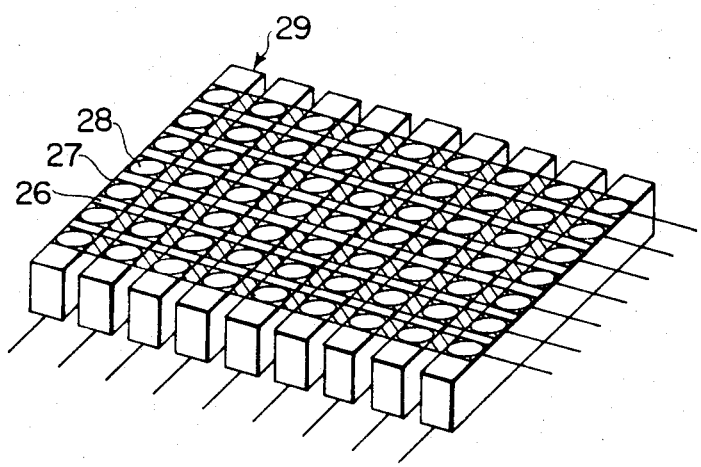
FIG. 8 is a schematic arrangement plan of a spacial modulator used in the holographic apparatus shown in FIG. 7.

Application of the hologram production system according to the present invention is not limited to a holographic apparatus such as shown in FIG. 6, where two separate optical systems are provided for separately providing independent information both in the line direction and in the column direction. The present invention can as well be applied to a spacial modulator such as shown in FIG. 8, where a plurality of filamentary electrodes are provided in the line direction of the front surface and in the column direction on the back surface of a quarter-wavelength plate, which is capable of electrically reversing the direction of the crystallographic axis, and a voltage is applied such that information is written line by line in each of the electrodes on both the front and back surfaces, and then multiplex recording is effected in the hologram medium line by line, by using for instance an optical system as shown in FIG. 7. The spacial modulator shown in FIG. 8 may be of any type if its crystallographic axis reversing voltage has a certain threshold value. It is, for instance, possible to use gadolinium molybdate or the like.

In FIG. 8, numeral 29 denotes a plurality of crystals elongated in the line direction, each of said crystals being provided with transparent electrodes on both sides thereof. Between each adjoining bit is provided an insulating area 19. Passed across the surfaces of the crystals, in the line direction, are a plurality of electrodes 27, and light is passed through the central part 28 of each bit.

FIG. 7 diagrammatically shows the principal parts of a holographic memory using a spacial modulator of the voltage coincidence system (where a voltage is applied simultaneously to the electrodes on both front and back sides, and light passes therethrough or is intercepted) as shown in FIG. 3. The object light beam is expanded by a beam expander 4 and polarized by a polarizing plate 35 to become vertical linearly polarized light. The spacial modulator 36 is made of a quarter-wavelength plate such as shown in FIG. 8, with its crystallographic axis being inclined 45° from the vertical line. The beam, upon passing through the modulator plate 36, becomes a circularly polarized light beam which is oriented either clockwise or counterclockwise according to the direction of the crystallographic axis corresponding to the information of each bit. Upon entering the quarter-wavelength plate 37, the clockwise circularly polarized light beam is converted into a vertical linearly polarized light beam while the counterclockwise circularly polarized light beam is changed into a horizontal linearly polarized light beam. The vertical light beam can pass through the polarizing plate 38 but the horizontal light beam is intercepted. The light which has passed through the polarizing plate 38 is focussed by a lens 15 and recorded on a hologram recording medium 18 as an interference fringe formed in cooperation with the reference light beam which has been phase-modulated by the phase modulator 25. The writing formula is the same one as used in the preceding embodiment, namely, information light is formed, line by line, or column by column, and the amount of phase modulation of the reference light beam is varied upon each formation of the information light beam, so that the amount of phase modulation is evenly distributed and finally a hologram is formed after the aforedescribed multiple exposure pattern.

The hologram made according to the above method using a voltage coincidence type spacial modulator is further improved in the signal-noise ratio of the reproduced image as compared with those obtained from the system using an optical system shown in FIG. 6.

Although the foregoing embodiments of the present invention have been described by focussing the discussion on applications to digital techniques, it will be apparent that the effects of the present invention can be also produced in applications to analog images (analog information).

As discussed above, the present invention, based on a multiple exposure system, makes it possible to produce a hologram which is capable of reproducing an image with little noise by evenly modulating the phase of the reference or object light at the time of each exposure and, hence, the present invention greatly contributes to an improvement in hologram production.

We claim:

1. A multiplex exposure type holographic apparatus for producing a hologram by permitting a first light beam, which has passed through a two-dimensional light information composing element and a second reference light beam, which is to interfere with said first light beam to interfere with each other on the surface of a light recording medium, characterized by the provision of
   means for two-dimensionally sectioning said light information composing element into a plurality of areas and applying the information, which has been formed in each section, to the object light in timely succession and within an equal time span, and
   a spacial modulator for supplying a differing random phase shift to each object light beam which has passed through each of said sections in timely succession.

2. A holographic apparatus according to claim 1, including a light information composing element made from a matrix with an M number of lines and an N number of columns (M and N being positive intergers) and a space modulator for providing a random phase shift, line by line, (or column by column) to the information light beam which has passed through said M number of lines (or N number of columns).

3. A holographic apparatus according to claim 1, in which said random phase shift is imparted in timely succession by changing the polarization of a ferroelectric element by an electric signal.

4. A holographic apparatus according to claim 1, including a spacial modulator comprising a ferroelectric element adapted to apply a random phase shift to each of the plurality of sections in response to an electric signal and a power source for generating said electric signal.

5. A holographic apparatus according to claim 1, including a spacial modulator comprising a plurality of ferroelectric elements whose states of polarization are changed independently of one another by an electric signal and a power source for generating said electric signal.

6. A holographic apparatus according to claim 1, including a spacial modulator comprising a ferroelectric element whose state of polarization is changed from line to line (or from column to column) by an electric signal and a power source for generating said electric signal.

* * * * *